(12) United States Patent
Erlenmaier et al.

(10) Patent No.: US 8,360,944 B2
(45) Date of Patent: Jan. 29, 2013

(54) LASER NOZZLE CHANGING DEVICE

(75) Inventors: Werner Erlenmaier, Gerlingen (DE);
Frank Schmauder, Metzingen (DE);
Armin Felber, Frelenbach (CH); Reto Gedeon, Root (CH)

(73) Assignee: TRUMPF Maschinen AG, Baar (CH)

( * ) Notice: Subject to any disclaimer, the term of this patent is extended or adjusted under 35 U.S.C. 154(b) by 1058 days.

(21) Appl. No.: 12/350,366

(22) Filed: Jan. 8, 2009

(65) Prior Publication Data

US 2009/0179014 A1 Jul. 16, 2009

(30) Foreign Application Priority Data

Jan. 12, 2008 (EP) .................................... 08000522

(51) Int. Cl.
*B23K 26/00* (2006.01)
*B23Q 3/155* (2006.01)

(52) U.S. Cl. .. 483/16; 483/58; 219/121.67; 219/121.78; 29/35.5

(58) Field of Classification Search .................. 29/35.5; 219/121.67, 121.78; 483/16, 58
See application file for complete search history.

(56) References Cited

U.S. PATENT DOCUMENTS

| | | | | |
|---|---|---|---|---|
| 3,443,309 A | * | 5/1969 | Gundlich et al. | ............... 483/44 |
| 4,858,290 A | * | 8/1989 | Hirose et al. | ................... 29/35.5 |
| 6,716,146 B2 | * | 4/2004 | Kato | ............................... 483/58 |
| 7,129,441 B2 | * | 10/2006 | Yamazaki et al. | ....... 219/121.78 |
| 7,438,676 B2 | * | 10/2008 | Yamazaki et al. | ............... 483/16 |
| 8,212,176 B2 | * | 7/2012 | Akiyama et al. | ......... 219/121.67 |
| 2006/0144831 A1 | * | 7/2006 | Schmidt et al. | ........... 219/121.72 |
| 2008/0058187 A1 | * | 3/2008 | Yamazaki et al. | ............... 483/16 |

FOREIGN PATENT DOCUMENTS

| | | |
|---|---|---|
| DE | 10056330 | 3/2002 |
| DE | 102006028730 | 7/2007 |
| EP | 1454698 | 9/2004 |
| EP | 1602438 | 12/2005 |
| EP | 1602439 | 12/2005 |
| FR | 2547230 | 12/1984 |
| JP | 58192731 | 11/1983 |
| JP | 06 023580 | 2/1994 |

OTHER PUBLICATIONS

European Search Report with English translation dated Aug. 8, 2008, in related European Patent Application No. 08 000 522.6, 6 pages.

* cited by examiner

*Primary Examiner* — Alexander P Taousakis

(74) *Attorney, Agent, or Firm* — Fish & Richardson P.C.

(57) ABSTRACT

A mechanical device is used to change a laser nozzle on a nozzle receiving member of a laser processing machine for processing workpieces. The mechanical device has a nozzle magazine having a nozzle holder carrier, and at least one nozzle holder for a laser nozzle being provided on the nozzle holder carrier. The mechanical device also includes a positioning drive and a change drive, both drives having a common drive motor. Between the drive motor on the one hand and the nozzle holder carrier and the nozzle holder on the other hand, there is provided a coupling that can be switched by means of a switching device between a supply state, in which a drive connection exists between the drive motor and the nozzle holder carrier, and a change state, in which a drive connection exists between the drive motor and the nozzle holder.

20 Claims, 7 Drawing Sheets

LASER NOZZLE CHANGING DEVICE

CROSS REFERENCE TO RELATED APPLICATION

This application claims priority under 35 U.S.C. §119(a) to European Application No. 08 000 522.6, filed on Jan. 12, 2008, the entire contents of which are hereby incorporated by reference.

TECHNICAL FIELD

The invention relates to a mechanical device for changing a laser nozzle of a nozzle receiving member of a laser processing machine for processing workpieces.

BACKGROUND

DE 100 56 330 C1 discloses a mechanical nozzle changing device having a nozzle magazine that has three nozzle holders, one for each laser nozzle. The nozzle magazine is provided on a frame that is itself provided with an electromotive or pneumatic positioning drive. Using the positioning drive, the nozzle holders of the nozzle magazine can be moved relative to a laser processing head of a laser processing machine into a position for a screwing and unscrewing action. If a nozzle holder is in the screwing and unscrewing position, it is possible for it to assemble or disassemble a laser nozzle on/from the laser processing head. In both instances, the respective nozzle holder is rotated about a nozzle holder rotation axis by means of a screw drive. Depending on the direction of rotation, the nozzle holder screws in or unscrews a laser nozzle on the laser processing head. Each nozzle holder of the previously known nozzle changing device has its own screw drive.

SUMMARY

In one general aspect, a mechanical device includes a nozzle magazine on a nozzle holder carrier, where the nozzle magazine includes at least one nozzle holder configured to receive a laser nozzle; a positioning drive configured to jointly move the nozzle holder carrier and the nozzle holder with a positioning movement and to thereby move the nozzle holder into a change position; a change drive configured to rotate the nozzle holder, which is in the change position, about a nozzle holder rotation axis; a common drive motor for the positioning drive and the change drive; and a switchable coupling between the common drive motor on the one hand and the nozzle holder carrier and the nozzle holder on the other hand. The switchable coupling is configured to be switched by a switching device such that in a first switching state of the switchable coupling, a drive connection is produced between the drive motor and the nozzle holder carrier to enable the nozzle holder carrier and the nozzle holder to be jointly moved with a positioning movement and to thereby enable the nozzle holder to be moved into a change position; and in a second switching state of the switchable coupling, a drive connection is produced between the drive motor and the nozzle holder, which is in the change position, to enable the nozzle holder to be rotated about the nozzle holder rotation axis with a change movement.

Implementations can include one or more of the following features. For example, nozzle holder carrier can be a magazine turret that is configured to be rotated about a turret rotation axis with a positioning movement actuated by the common drive motor.

The switchable coupling can include a coupling element that is configured to be moved upon movement of the switching device into a supply position associated with the first switching state of the switchable coupling and into an change position associated with the second switching state of the switchable coupling such that, in the supply position, the coupling element produces a drive connection between the drive motor and the nozzle holder carrier and, in the change position, the coupling element produces a drive connection between the drive motor and the nozzle holder. The coupling element of the switchable coupling can be configured to be moved counter to the action of a restoring force between the supply position and the change position. The coupling element can be configured to be moved counter to the action of the restoring force from the supply position to the change position. The coupling element can be configured to be moved counter to the action of the restoring force from the change position to the supply position.

The switching device can include a switching element that is configured to be moved by actuation of a switching drive into a first switching position that is associated with the first switching state of the coupling or into a second switching position that is associated with the second switching state of the coupling. The switching element of the switching device can be configured to be moved counter to the action of a restoring force from the first switching position into the second switching position or from the second switching position into the first switching position.

The switchable coupling can include a coupling element that, by means of the switching device, is configured to be moved into a supply position that is associated with the first switching state of the switchable coupling and into a change position that is associated with the second switching state of the switchable coupling. The coupling element in the supply position can produce a drive connection between the drive motor and the nozzle holder carrier and, in the change position, produces a drive connection between the drive motor and the nozzle holder. The switching device of the switchable coupling can include a switching element that is configured to be moved by means of a switching drive between a first switching position associated with the supply state of the coupling and a second switching position associated with the change state of the coupling. The coupling element of the switchable coupling can be configured to be moved into the supply position when the switching element of the switching device is moved into the first switching position. The coupling element of the switchable coupling can be configured to be moved into the change position when the switching element of the switching device is moved into the second switching position.

The mechanical device can include a switchable arresting device that is configured to arrest the nozzle holder carrier of the nozzle magazine against a positioning movement when the nozzle holder is in the change position. The switchable arresting device for the nozzle holder carrier can include an arresting element that is configured to be moved by an arresting drive into one or more of an arresting position and a release position, the arresting element in the arresting position arresting the nozzle holder carrier against a positioning movement being carried out and in the release position releasing the nozzle holder carrier to carry out a positioning movement. The arresting element of the arresting device can be configured to be moved counter to the action of a restoring force between the arresting position and the release position. At least two of the coupling element, the switching element, and the arresting element can be drivingly connected to each other.

In another general aspect, a laser processing machine for processing workpieces includes a nozzle receiving member configured to receive a laser nozzle and a mechanical device that is configured to assemble a laser nozzle on the nozzle receiving member, to disassemble a laser nozzle from the nozzle receiving member, or to both assemble a laser nozzle on the nozzle receiving member and to disassemble a laser nozzle from the nozzle receiving member. The mechanical device includes a nozzle magazine on a nozzle holder carrier, where the nozzle magazine includes at least one nozzle holder configured to receive a laser nozzle; a positioning drive configured to jointly move the nozzle holder carrier and the nozzle holder with a positioning movement and to thereby move the nozzle holder into a change position; a change drive configured to rotate the nozzle holder, which is in the change position, about a nozzle holder rotation axis; a common drive motor for the positioning drive and the change drive; and a switchable coupling between the common drive motor on the one hand and the nozzle holder carrier and the nozzle holder on the other hand. The switchable coupling is configured to be switched by a switching device such that in a first switching state of the switchable coupling, a drive connection is produced between the drive motor and the nozzle holder carrier to enable the nozzle holder carrier and the nozzle holder to be jointly moved with a positioning movement and to thereby enable the nozzle holder to be moved into a change position; and in a second switching state of the switchable coupling, a drive connection is produced between the drive motor and the nozzle holder, which is in the change position, to enable the nozzle holder to be rotated about the nozzle holder rotation axis with a change movement.

The mechanical device is compact because a common drive motor is used to transfer the relevant nozzle holder of the nozzle magazine into a change (assembly/disassembly) position and to produce the change (assembly/disassembly) movement of the nozzle holder. Owing to the omission of separate drive motors for both functions, the structural size of the drive and therefore of the entire mechanical device is reduced, for example, to a minimum. The same applies to the technical and financial complexity associated with the drive configuration. The switchable coupling enables the use a single drive motor for the positioning movement and for the change (assembly/disassembly) movement of the relevant nozzle holder. Owing to its switchability, this coupling can produce a drive connection optionally between the drive motor and the nozzle holder carrier ("supply state" of the coupling) or between the drive motor and the nozzle holder which is moved into the change (assembly/disassembly) position ("change state" or "assembly/disassembly state" of the coupling).

The nozzle magazine can be constructed as a turret magazine and accordingly the nozzle holder carrier of the nozzle magazine can be constructed as a magazine turret and can be rotated about a turret rotation axis by means of the common drive motor of the positioning drive and change drive. Such a turret magazine affords the possibility of accommodating a plurality of nozzle holders within a small space and transferring them into the operating position required in each case. A turret magazine of the type described accordingly contributes significantly to the compact structure of the overall device according to the invention. However, other magazine constructions are also conceivable according to the invention.

The switchable coupling of the mechanical device for changing (that is, assembly and/or disassembly) of a laser nozzle can be produced technically in different manners.

The switchable coupling can include a coupling element that defines the switching state of the coupling by means of its position. On the one hand, a coupling of this type has the robustness required for the operational use of the mechanical device and consequently an excellent level of operational reliability. Furthermore, the control of the switching state of the coupling can be carried out with a relatively low level of technical complexity in terms of control.

The coupling element of the switchable coupling can independently return to the initial position under the action of the restoring force which occurs.

The switchable coupling of the mechanical device can include a switching device with a switching element whose position determines the switching state of the coupling. The switching element of the switching device can be moved counter to the action of a restoring force during the respective switching operation.

A switching movement of the switching element of the switching device for the switchable coupling can bring about a switching movement of the coupling element of the switchable coupling.

The nozzle holder carrier of the nozzle magazine can be secured against undesirable displacement when the nozzle holder is moved into the assembly/disassembly position. This feature ensures in particular that the nozzle holder retains its desired position during the assembly/disassembly movement that it carries out.

In order to secure the nozzle holder in the assembly/disassembly position, an arresting element can be used and can be moved by means of an arresting drive into an arresting position and/or into a release position. The switching state of the arresting device is accordingly defined by the position of an arresting element. The switching movement of the arresting element of the arresting device can be carried out counter to the action of a restoring force.

The coupling element of the switchable coupling, the switching element of the switching device for the switchable coupling, and the arresting element of the arresting device for the nozzle holder carrier of the nozzle magazine can be at least partially drivingly connected to each other. This drive connection allows at least two of the elements mentioned to be switched by means of a common drive or a common drive motor. The different switch functions can consequently be carried out with a low level of technical and financial complexity. The structural size of the overall arrangement is reduced or minimized.

The details of one or more embodiments of the invention are set forth in the accompanying drawings and the description below. Other features and advantages of the invention will be apparent from the description and drawings, and from the claims.

DETAILED DESCRIPTION

Figure 6:
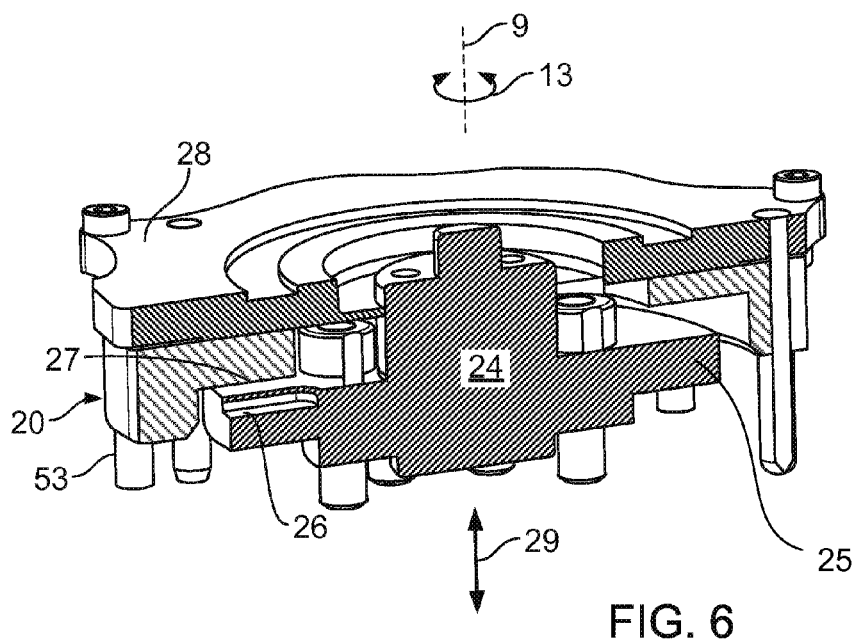
FIG. 6 is a cross-sectional view of a portion of the drive of FIG. 5, drawn to an enlarged scale.
Figure 7:
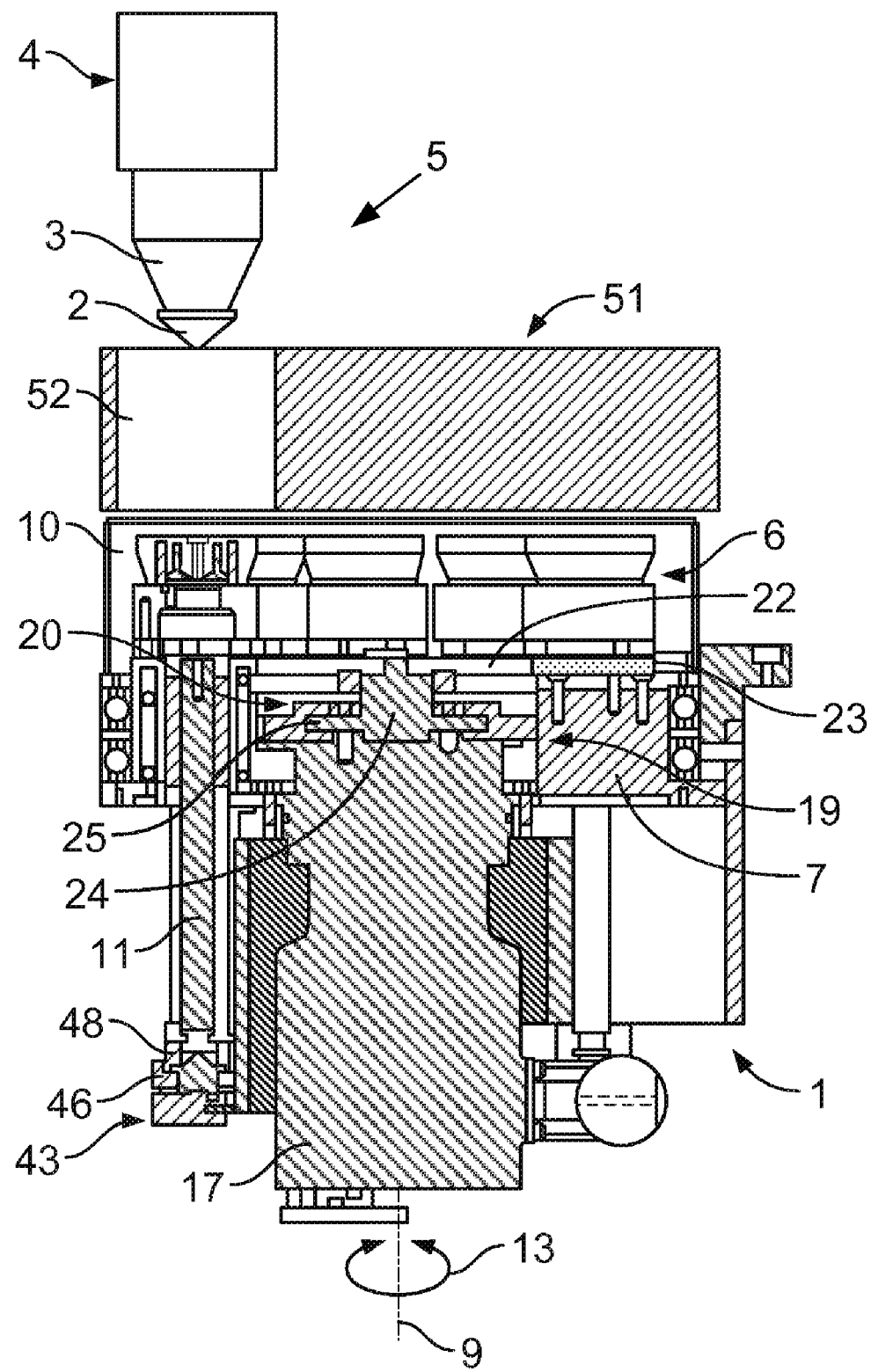
FIG. 7 is a cross-sectional view of a laser processing machine with the mechanical nozzle changing device of FIG. 2.
Figure 8:
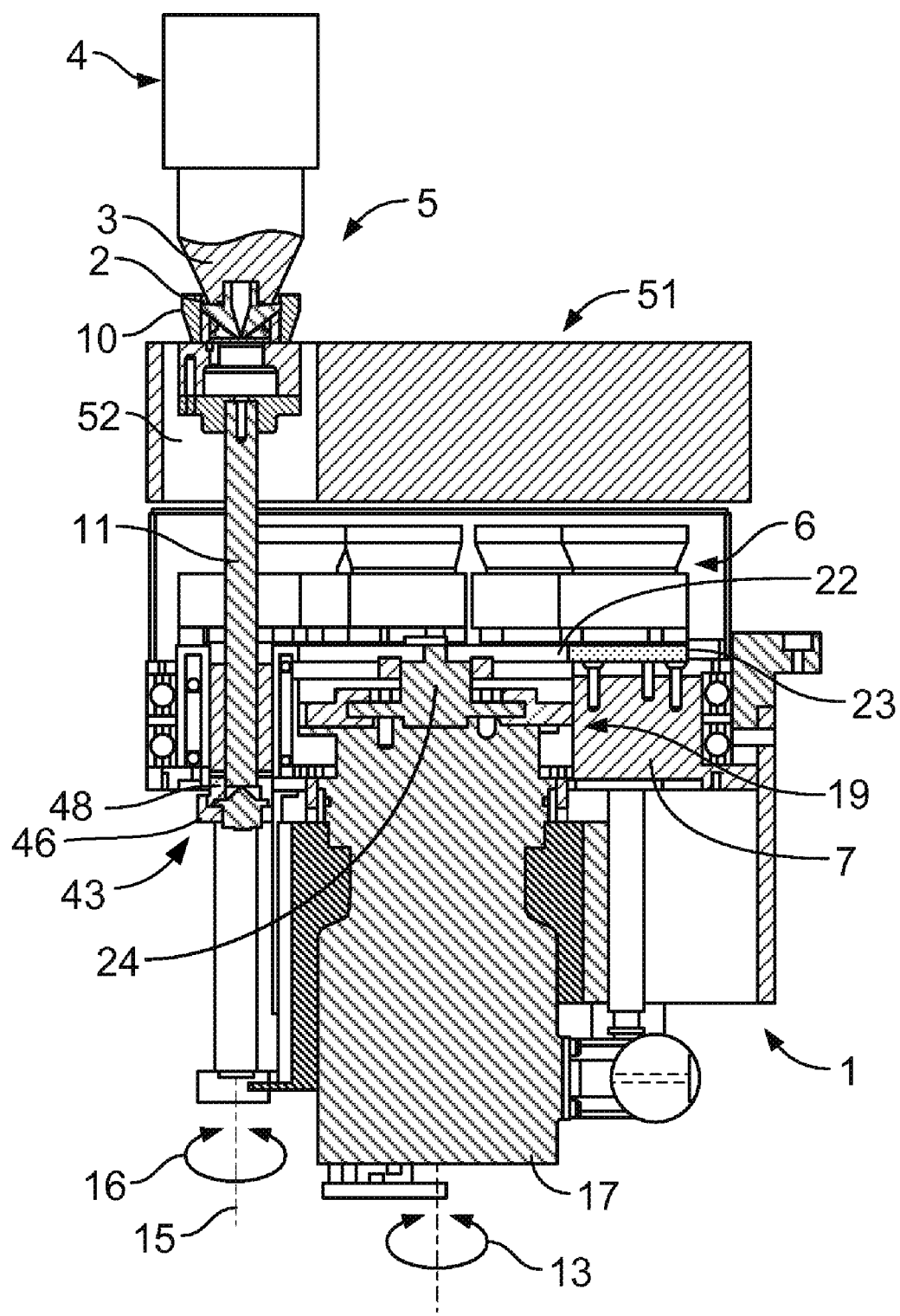
FIG. 8 is a cross-sectional view of the laser processing machine of FIG. 7 with the mechanical nozzle changing device in the operating state according to FIG. 3.

Referring to FIGS. 1-8, a nozzle changing device 1 is a mechanical device that is used to change laser nozzles 2 (shown in FIGS. 7 and 8) of a nozzle receiving member 3 (shown in FIGS. 7 and 8), which is in turn provided on a laser processing head 4 of a laser processing machine 5 (shown in FIGS. 7 and 8). On the laser processing machine 5, during regular operation, metal sheets are cut by means of a laser cutting beam. In particular, the nozzle changing device 1 is used to assemble (or attach) the laser nozzle 2 on or to the nozzle receiving member 3, or to disassemble (or detach) the laser nozzle 2 from the nozzle receiving member 3.

The nozzle changing device 1 includes a nozzle magazine that is constructed as a turret magazine 6. A magazine turret 7, which acts as a nozzle holder carrier, is supported on a housing 8 of the nozzle changing device 1 so as to rotate about a turret rotation axis 9.

A plurality of nozzle holders 10 are inserted in the magazine turret 7. Each of the nozzle holders 10 has a shaft 11 that protrudes downwards beyond the magazine turret 7 and has a cross-section that is not circular. In order to simplify the illustration, the nozzle holders 10 are all illustrated as being empty in FIGS. 1-3. During operational use on the laser processing machines (FIGS. 7 and 8), at least one of the nozzle holders 10 accommodates a laser nozzle 2.

Using a positioning drive 12, the magazine turret 7 can be moved in a supply direction about the turret rotation axis 9 illustrated by a double-headed arrow 13. It is thereby possible to transfer a nozzle holder 10 used when changing a laser nozzle 2 on the laser processing head 4 in the supply direction 13 into a change position, which is also referred to as an assembly/disassembly (or rotation) position. In the assembly/disassembly position, the nozzle holder 10 is driven by means of a change drive 14 (which can also be referred to as an assembly/disassembly drive) about a nozzle holder rotation axis 15. The direction of the change (that is, the assembly/disassembly) movement of the relevant nozzle holder 10 is illustrated in FIG. 2 by means of a double-headed arrow 16.

As the common drive motor of the positioning drive 12 and the assembly/disassembly drive 14, there is provided an electric drive motor 17 that a drive control system 18 controls. When the nozzle changing device 1 is used as part of the laser processing machine 5, the drive control system 18 is integrated in a computer numerical control (CNC) system thereof.

The drive motor 17 can optionally move the magazine turret 7 with a positioning movement about the turret rotation axis 9 or drive the relevant nozzle holder 10 with a change movement (which can be considered an assembly/disassembly movement) about the nozzle holder rotation axis 15. For this purpose, between the drive motor 17 on the one hand and the magazine turret 7 and the nozzle holders 10 on the other hand, a switchable coupling 19 is provided with a coupling element in the form of a coupling plate 20. Details of the switchable coupling 19 can be found in FIGS. 4-6. In these illustrations, the magazine turret 7 is illustrated without the nozzle holders 10. Receiving members 21 can be seen on the magazine turret 7 and are used to support the nozzle holders 10.

Figure 1:
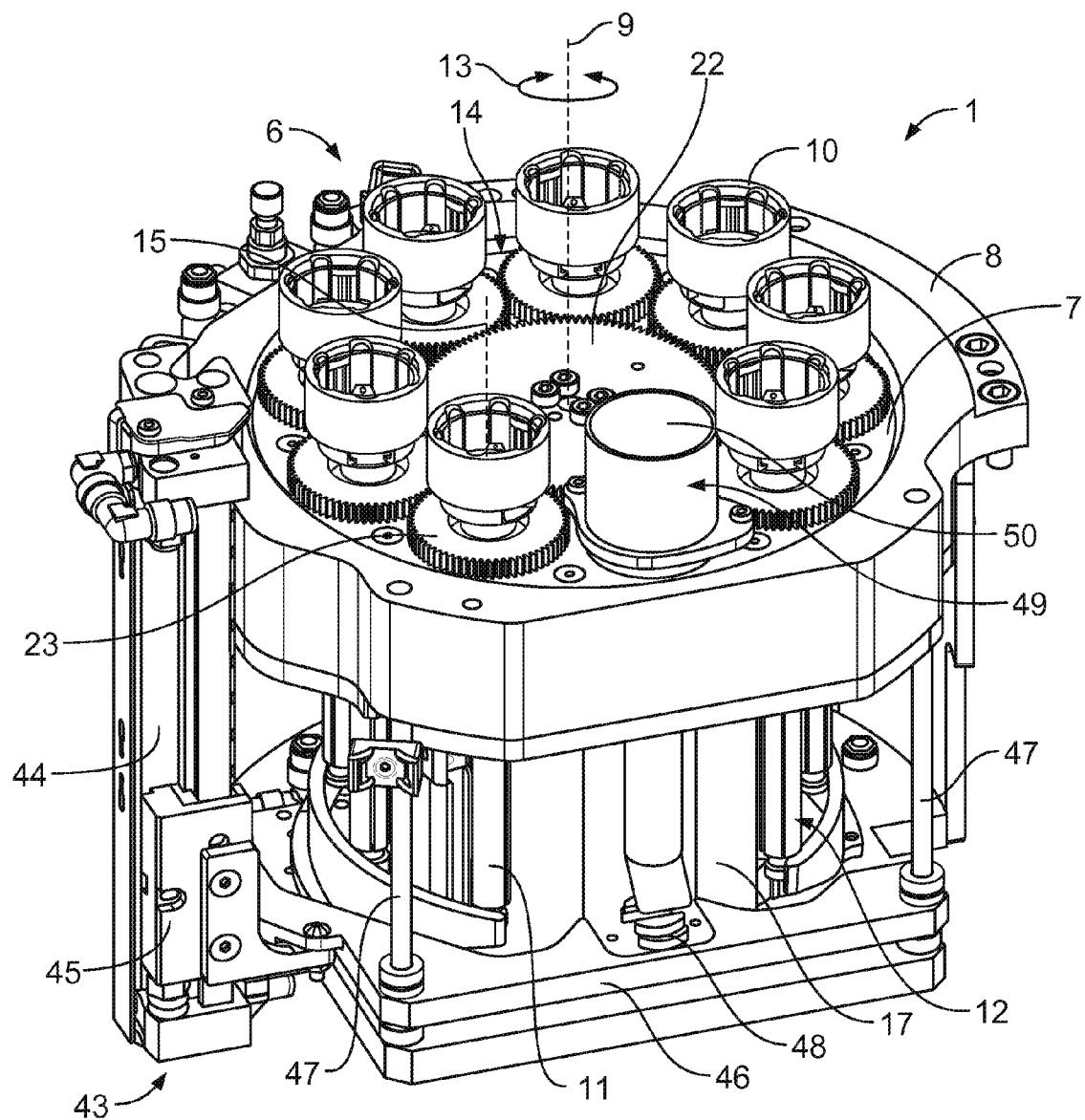
FIG. 1 is a perspective view of a mechanical nozzle changing device with a nozzle magazine that is constructed as a turret magazine and whose magazine turret assumes a first rotation position.
Figure 2:
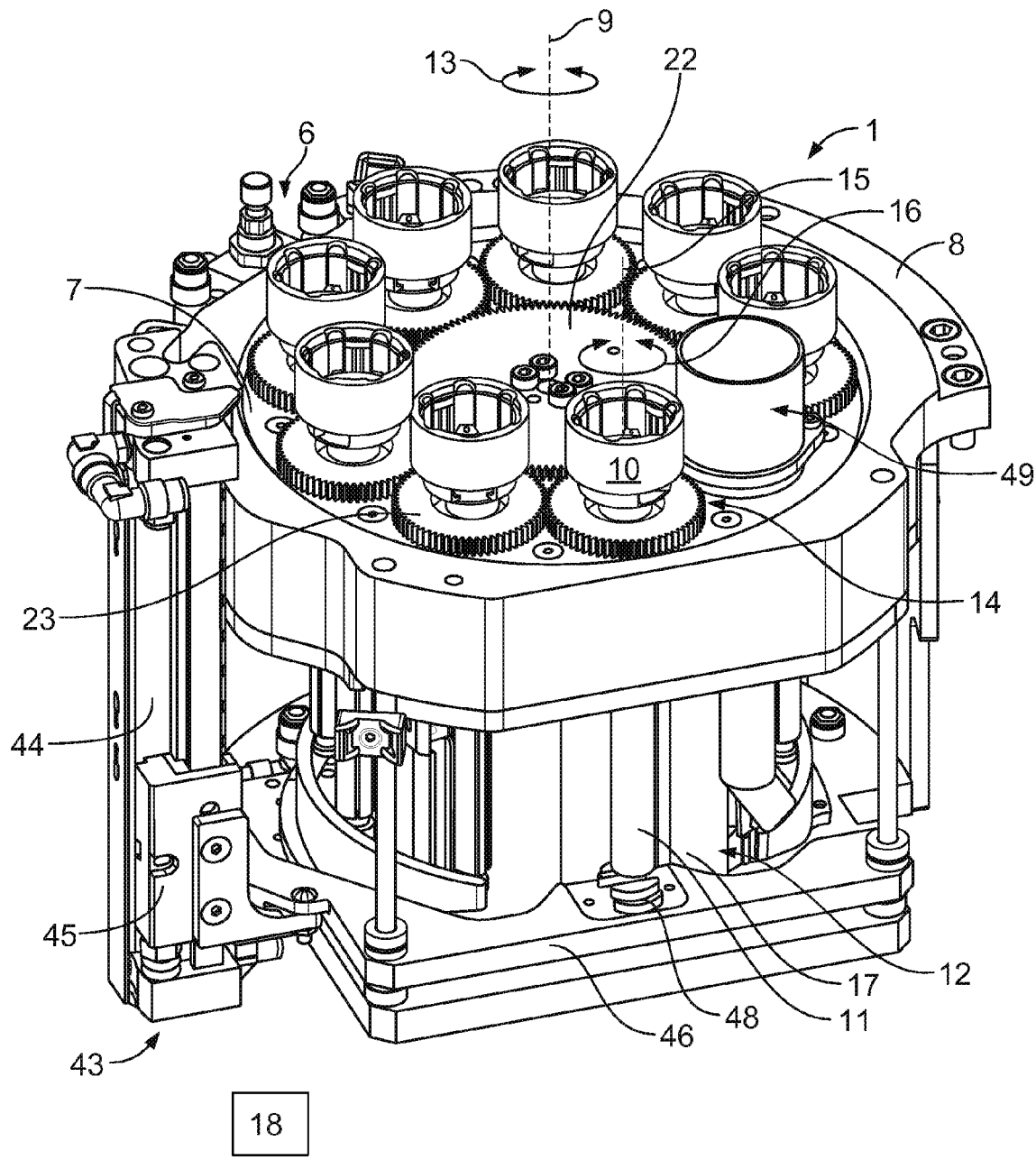
FIG. 2 is a perspective view of the mechanical nozzle changing device of FIG. 1 with a second rotation position of the magazine turret and a nozzle holder that is moved into an assembly/disassembly rotation position.
Figure 3:
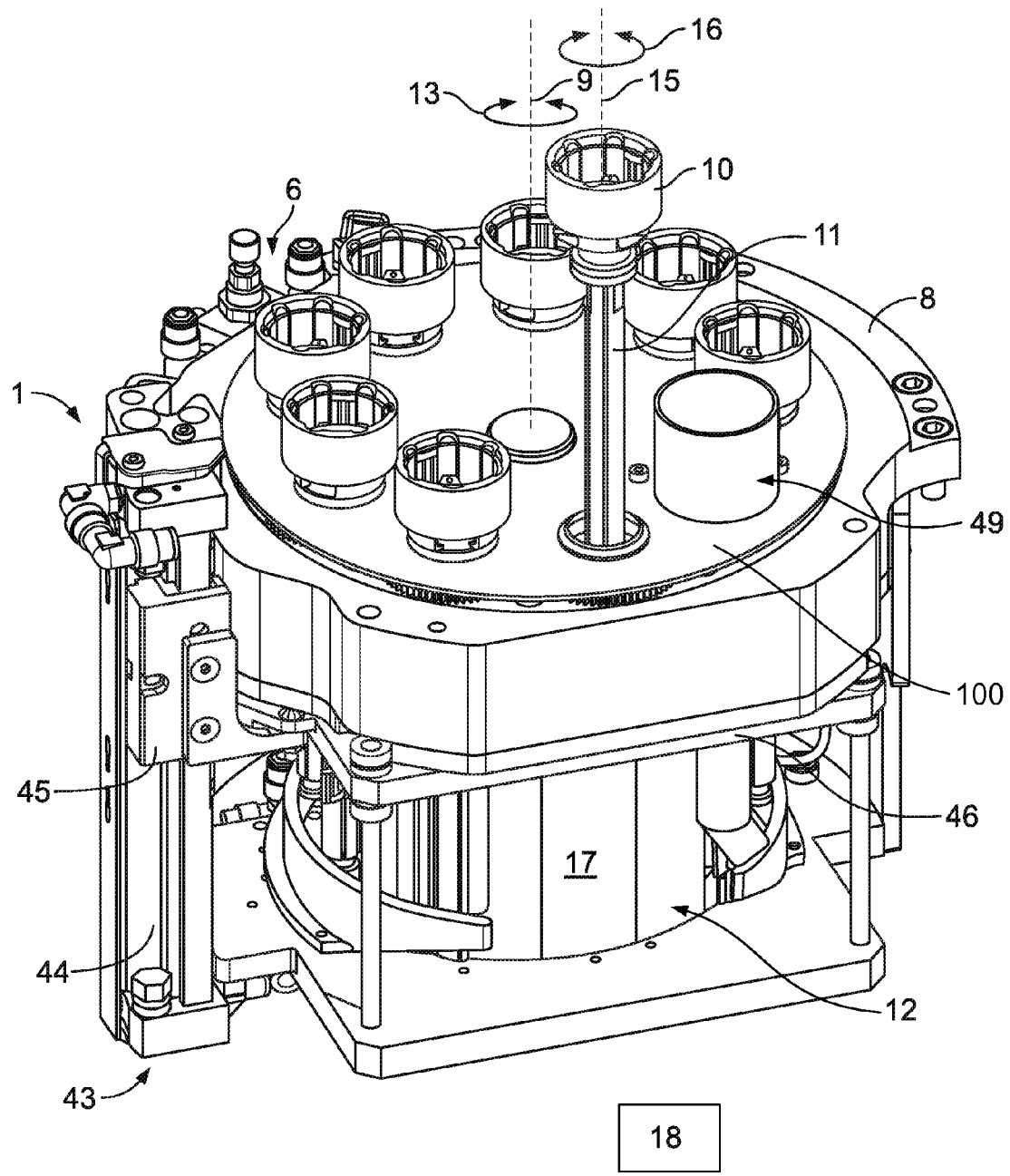
FIG. 3 is a perspective view of the mechanical nozzle changing device of FIG. 2 with the nozzle holder being moved into the assembly/disassembly rotation position and being raised from the magazine turret.

The assembly/disassembly drive 14 includes a sun gear 22 and planet gears 23, which are illustrated in FIGS. 1 and 2. In FIG. 3, the sun gear 22 and the planet gears 23 are located below a cover 100, which is not illustrated in FIGS. 1 and 2.

The sun gear 22 is connected to a motor shaft 24 (shown in FIGS. 4-8) of the drive motor 17 in a rotationally secure manner. The sun gear 22 engages with a front toothed arrangement with associated front toothed arrangements of the planet gears 23. The shaft 11 of a nozzle holder 10 extends through each of the planet gears 23.

Below the sun gear 22, a hub 25 (shown in FIGS. 4-8) is provided on the motor shaft 24. The hub 25 includes an upwardly open engagement ledge 26 that receives coupling projections 27 at the lower side of the coupling plate 20 (shown in FIGS. 5 and 6). The coupling plate 20 can be moved in an intermediate space between the hub 25 and a gear cover 28, which is screwed to the magazine turret 7 in a switching direction 29. A switching device 30 is used to move the coupling plate 20 in the switching direction 29. The switching device 30 includes restoring springs 31 that are tensioned between the upper side of the coupling plate 20 and the lower side of the gear cover 28 and of which only one can be seen in FIGS. 4 and 5.

The restoring springs 31 are part of a switching drive 32 of the switching device 30 for the coupling plate 20. Another integral component of the switching drive 32 is a pneumatic lifting device 33. The lifting device 33 includes a pneumatic cylinder 34 that is secured to the housing 8 and a pneumatic piston 35 that is guided inside the pneumatic cylinder 34. The pneumatic lifting device 33 is also controlled by the drive control system 18.

The pneumatic piston 35 of the pneumatic lifting device 33 actuates a pin arrangement 36. The pin arrangement 36 includes an upper pressure pin 37 and a lower indexing pin 38.

The pressure pin 37 acts as a switching element of the switching device 30 for the coupling plate 20. The indexing pin 38 forms an arresting element of a switchable arresting device 39 for the magazine turret 7. In this capacity, the indexing pin 38 co-operates with a pin receiving member 40 on an inner flange 41 of the magazine turret 7. Furthermore, the pin receiving member 40 also guides the pressure pin 37. With a radially protruding pin head 42, the pressure pin 37 extends beyond the pin receiving member 40 at the side.

The coupling plate 20 engages in the inner flange 41 of the magazine turret 7 with guiding pins 53, as can be seen in FIG. 6. By means of the guiding pins 53, the coupling plate 20 is movably guided on the magazine turret 7 in the switching direction 29. At the same time, the guiding pins 53 produce a positive-locking connection between the coupling plate 20 and the magazine turret 7 acting in the supply direction 13.

As can be seen, for example, from FIGS. 1-3, there is provided at the outer side of the housing 8 of the nozzle changing device 1, a nozzle holder lifting device 43 that is also controlled by means of the drive control system 18. The nozzle holder lifting device 43 includes a lifting cylinder 44 that is fitted to the housing 8 of the nozzle changing device 1 and inside which a lifting piston (which cannot be seen in the Figures) is movably guided in a vertical direction. In this design, a piston rod is not inserted into the lifting piston, therefore, the lifting piston is connected to an intermediate piece 45 which in turn engages a lifting plate 46.

The lifting plate 46 is movably guided in a vertical direction on guiding rods 47 of the housing 8 of the nozzle changing device 1. Between the guiding rods 47, there is provided on the lifting plate 46 a shaft receiving member 48 that is open in the supply direction 13 to enable the free end of the shafts 11 of the nozzle holders 10 to be introduced into the shaft receiving member 48 during a positioning movement of the magazine turret (the nozzle holder carrier) 7.

FIGS. 1-3 also show a "dummy station" 49 that is provided on the magazine turret 7 and that has an aperture 50 in the form of a hollow cylinder.

On the laser processing machine 5, the nozzle changing device 1 is arranged according to FIGS. 7 and 8 at the lower side of a workpiece support 51 of the laser processing machine 5. The workpiece support 51 has a through-opening 52.

The operating state of the nozzle changing device 1 illustrated in FIG. 1 is associated with a regular cutting operation of the laser processing machine 5. On the laser processing machine 5, during a regular cutting operation, the dummy station 49 is accordingly located with the hollow-cylinder-like aperture 50 below the through-opening 52 of the workpiece support 51. This operating state of the laser processing machine 5 is not illustrated separately for reasons of simplification.

Particles of dirt, in particular, the slag and metal splashes that are produced during the sheet cutting operation can pass through the nozzle changing device 1 through the hollow-cylinder-like aperture 50 of the dummy station 49 under the action of gravitational force, while the nozzle holders 10 of the turret magazine 6 are protected from undesirable contamination in a position remote from the through-opening 52 of the workpiece support 51.

Figure 4:
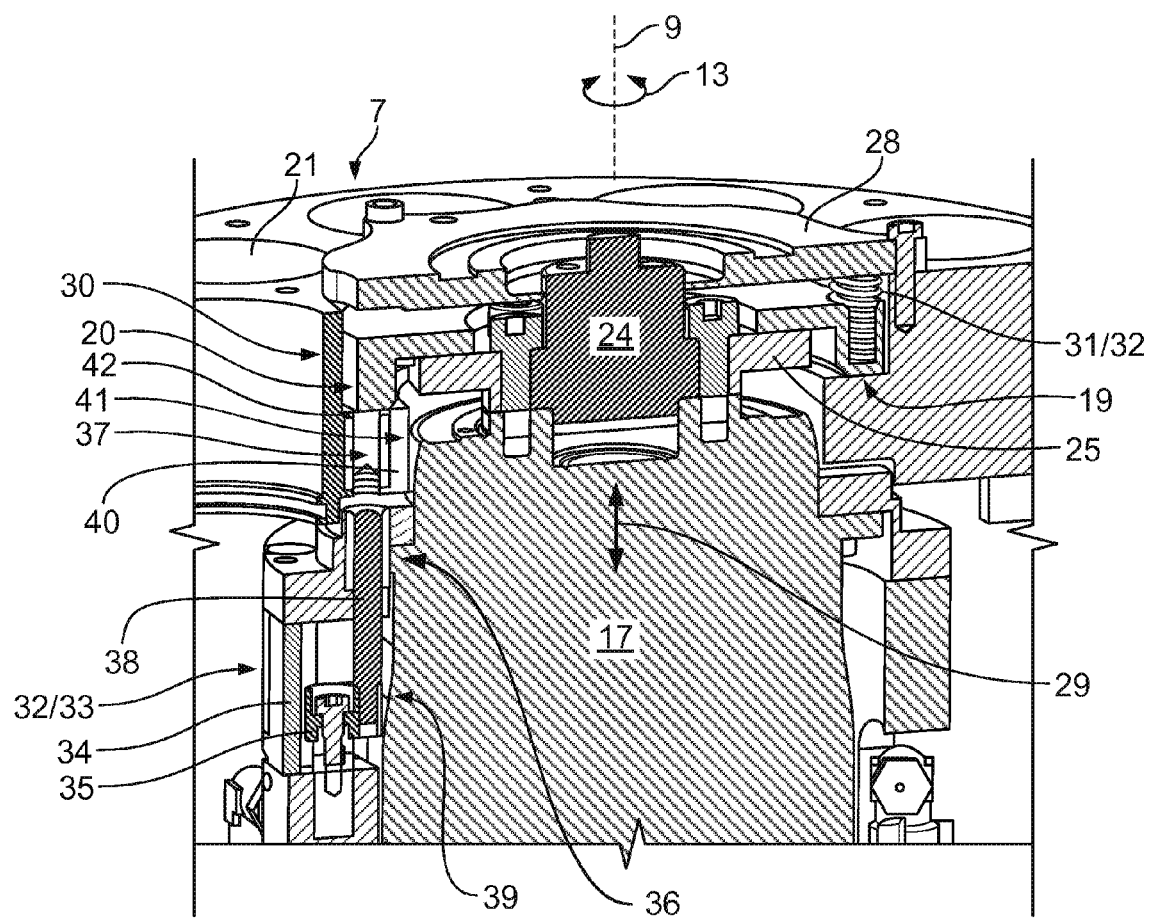
FIG. 4 is a cross-sectional view through a drive of the nozzle changing device of FIGS. 1-3 with a switchable coupling in a first switching state.
Figure 5:
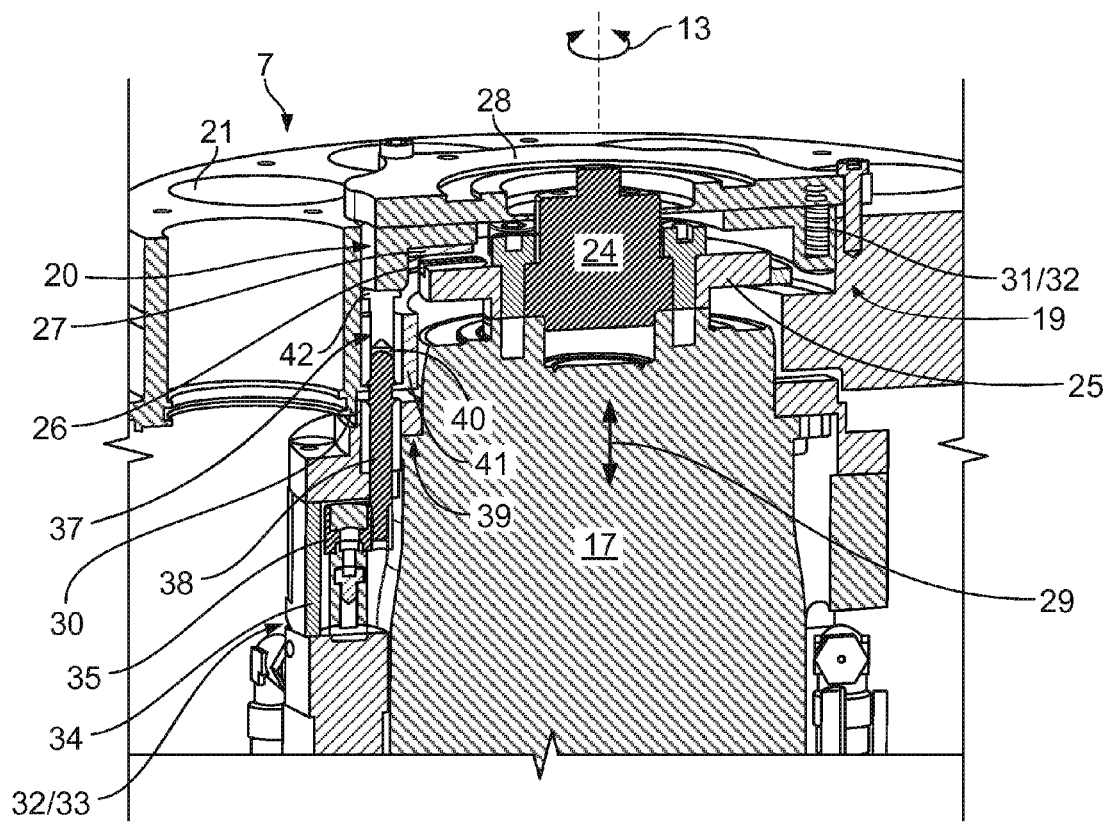
FIG. 5 is a cross-sectional view through the drive of the nozzle changing device of FIGS. 1-3 with a second switching state of the switchable coupling.

The switchable coupling 19 is switched into the "supply state" according to FIG. 4. The coupling projections 27 at the lower side of the coupling plate 20 are urged into the engagement ledge 26 at the upper side of the hub 25, which rests on the motor shaft 24. The coupling plate 20 is accordingly in the "supply position" in which it produces a drive connection between the drive motor 17 and the magazine turret 7.

Based on the relationships according to FIG. 1, the drive motor 17 is actuated in a controlled manner by the drive control system 18. Owing to the drive connection with the magazine turret 7, the drive motor 17 moves the magazine turret 7 together with the nozzle holders 10, which are supported thereon, about the turret rotation axis 9 through a defined angle of rotation in the supply direction 13. Consequently, the empty nozzle holder 10 that is directly adjacent to the dummy station 49 on the magazine turret 7 in the supply direction, reaches the position in which the dummy station 49 was previously arranged (FIG. 2). On the laser processing machine 5, the empty nozzle holder 10 is located below the through-opening 52 of the workpiece support 51. The situation that consequently occurs on the laser processing machine 5 is illustrated in FIG. 7.

The switchable coupling 19 is still in the supply state, the coupling plate 20 further assumes the supply position thereof in the switching direction 29. The empty nozzle holder 10 that was supplied previously is moved into the assembly/disassembly position in which it is located opposite the laser nozzle 2, which is fitted on the laser processing head 4 in a vertical direction.

In order to secure the assembly/disassembly position of the empty nozzle holder 10, the arresting device 39 is actuated in a numerically controlled manner. More precisely, the indexing pin 38 of the two-piece pin arrangement 36 is raised by means of the pneumatic lifting device 33 that acts as an arresting drive from the release position according to FIG. 4 into the arresting position according to FIG. 5. Owing to this lifting movement, the indexing pin 38 enters the pin receiving member 40 on the inner flange 41 of the magazine turret 7. Owing to the positive-locking connection between the indexing pin 38, which is supported on the housing 8 of the nozzle changing device 1, and the inner flange 41 of the magazine turret 7, the magazine turret 7 and the empty nozzle holder 10 that is moved into the assembly/disassembly position are blocked against positioning movement about the turret rotation axis 9.

With the actuation of the arresting device 39 for the magazine turret 7, the switching device 30 for the coupling plate 20 is also actuated. When entering the pin receiving member 40 on the inner flange 41 of the magazine turret 7, the indexing pin 38 acts on the lower end of the pressure pin 37, which is guided in the pin receiving member 40. Thus the indexing pin 38 also forms an element of the switching device 30 of the switchable coupling 19. The pressure pin 37 moves, counter to the action of the restoring force applied by the restoring springs 31, via the coupling plate 20, from the first switching position thereof according to FIG. 4 into the second switching position according to FIG. 5. The pressure pin 37 lifts the coupling plate 20 that is acted on by the restoring springs 31 into the assembly/disassembly position thereof in which the coupling projections 27 at the lower side of the coupling plate 20 are urged out of the engagement ledge 26 at the upper side of the hub 25. Consequently, the switchable coupling 19 is in the "assembly/disassembly state". The drive motor 17 is uncoupled from the magazine turret 7 in the assembly/disassembly state of the switchable coupling 19.

At the same time that the switchable coupling 19 is switched into the assembly/disassembly state, the empty nozzle holder 10, which is in the assembly/disassembly position, is lifted by means of the nozzle holder lifting device 43 into the position according to FIG. 3. To this end, the lifting plate 46 is moved upwards by means of the lifting cylinder 44 and the lifting piston that is guided therein. The lifting plate 46 carries the shaft 11, which is arranged with the free end thereof in the shaft receiving member 48 and, via the shaft 11, also carries the empty nozzle holder 10. The empty nozzle holder 10 is lifted from its support on the magazine turret 7. Owing to the upward movement of the empty nozzle holder 10, the laser nozzle 2 on the laser processing head 4 reaches a location inside the nozzle holder 10.

Overall, the situation illustrated in FIG. 8 is produced. Via the motor shaft 24, the sun gear 22, which is mounted on the motor shaft 24 in a rotationally secure manner, and the planet gear 23, which surrounds with positive-locking connection in the assembly/disassembly direction 16 the shaft 11 of the upwardly moved nozzle holder 10, a drive connection is produced between the drive motor 17 and the nozzle holder 10, which is moved upwards. If the drive motor 17 is actuated with a corresponding direction of rotation, the nozzle holder 10 moves around the nozzle holder rotation axis 15 with a rotation direction in which the nozzle holder 10 unscrews the laser nozzle 2 to be disassembled on the laser processing head 4 with a disassembly movement.

If the laser nozzle 2 to be replaced is disassembled, the nozzle holder lifting device 43 is actuated again. The lifting plate 46 is lowered into the initial position thereof. The nozzle holder 10, which is occupied with the used laser nozzle 2 is then supported on the magazine turret 7 of the turret magazine 6.

At the same time that the nozzle holder lifting device 43 is actuated, the switching device 30 of the switchable coupling 19 and the arresting device 39 are actuated. The pneumatic piston 35 of the pneumatic lifting device 33 is lowered from the position according to FIG. 5 into the position according to FIG. 4. The pneumatic piston 35 carries the indexing pin 38 of the two-piece pin arrangement 36 from the arresting position in the inner flange 41 of the magazine turret 7 into the release position. The coupling plate 20 moves with support through the tensioned return springs 31 in a downward direction until it abuts the hub 25 and the coupling projections 27 on the lower side of the coupling plate 20 are urged into the engagement ledge 26 at the upper side of the hub 25. The pressure pin 37 is pushed by the coupling plate 20 into the pin receiving member 40 at the inner flange 41 of the magazine turret 7 and is thereby moved back into the first switching position thereof.

The switchable coupling is now in the supply state again, the coupling plate 20 assumes its supply position. Consequently, the situation according to FIG. 4 is produced again.

With a new positioning movement of the magazine turret 7 through the drive motor 17, a nozzle holder 10 with a laser nozzle 2 that is intended to be mounted on the laser processing head 4 reaches the assembly/disassembly position. In the manner described above, the arresting device 39 for the magazine turret 7 and the switching device 30 for the coupling plate 20 are actuated again. The indexing pin 38 is again moved thereby into the arresting position and the coupling plate 20 into the assembly/disassembly position.

Via the lifting plate 46, the nozzle holder 10, which is provided with the new laser nozzle 2, is lifted until the laser nozzle 2 to be mounted is positioned at the end face with the thread thereof on the thread of the nozzle receiving member 3 on the laser processing head 4. In a vertical direction, the new laser nozzle 2 is supported with resilient tensioning on the edge of the nozzle receiving member 3 on the laser processing head 4. The resilient tensioning can be derived from a spring that is provided in the nozzle holder 10 and that acts upon the laser nozzle 2 from below. If the drive motor 17 is driven with a corresponding direction of rotation, the nozzle holder 10, which is lifted upwards, is moved, with the laser nozzle 2, which is located therein, about the nozzle holder rotation axis 15 with an assembly movement by means of the sun gear 22 and the associated planet gear 23 and the laser nozzle 2, which is intended to be mounted, is screwed into the nozzle receiving member 3 of the laser processing head 4.

After the screwing-in operation has ended, owing to corresponding actuation of the switching device 30 of the switchable coupling 19, the arresting device 39 and the nozzle holder lifting device 43, the relationships according to FIG. 4 are produced again. By means of the drive motor 17, the dummy station 49 with the hollow-cylindrical aperture 50 is returned to the initial position according to FIG. 1. On the laser processing machine 5, it is now possible to resume regular cutting operation.

OTHER EMBODIMENTS

A number of embodiments have been described. Nevertheless, it will be understood that various modifications may be made without departing from the spirit and scope of the invention. Accordingly, other embodiments are within the scope of the following claims.

What is claimed is:

1. A mechanical device comprising:
   a nozzle magazine on a nozzle holder carrier, where the nozzle magazine includes at least one nozzle holder configured to receive a laser nozzle;
   a positioning drive configured to jointly move the nozzle holder carrier and the nozzle holder with a positioning movement and to thereby move the nozzle holder into a change position;
   a change drive configured to rotate the nozzle holder, which is in the change position, about a nozzle holder rotation axis;
   a common drive motor for the positioning drive and the change drive; and
   a switchable coupling between the common drive motor on the one hand and the nozzle holder carrier and the nozzle holder on the other hand, wherein the switchable coupling is configured to be switched by a switching device such that:
   in a first switching state of the switchable coupling, a drive connection is produced between the drive motor and the nozzle holder carrier to enable the nozzle holder carrier and the nozzle holder to be jointly moved with a positioning movement and to thereby enable the nozzle holder to be moved into a change position; and
   in a second switching state of the switchable coupling, a drive connection is produced between the drive motor and the nozzle holder, which is in the change position, to enable the nozzle holder to be rotated about the nozzle holder rotation axis with a change movement.

2. The mechanical device of claim 1, wherein the nozzle holder carrier is a magazine turret that is configured to be rotated about a turret rotation axis with a positioning movement actuated by the common drive motor.

3. The mechanical device of claim 1, wherein the switchable coupling comprises a coupling element that is configured to be moved upon movement of the switching device into a supply position associated with the first switching state of the switchable coupling and into an change position associated with the second switching state of the switchable coupling such that, in the supply position, the coupling element produces a drive connection between the drive motor and the nozzle holder carrier and, in the change position, the coupling element produces a drive connection between the drive motor and the nozzle holder.

4. The mechanical device of claim 3, wherein the coupling element is configured to be moved counter to the action of a restoring force between the supply position and the change position.

5. The mechanical device of claim 4, wherein the coupling element is configured to be moved counter to the action of the restoring force from the supply position to the change position.

6. The mechanical device of claim 4, wherein the coupling element is configured to be moved counter to the action of the restoring force from the change position to the supply position.

7. The mechanical device of claim 1, wherein the switching device of the switchable coupling comprises a switching element that is configured to be moved by actuation of a switching drive into a first switching position that is associated with the first switching state of the coupling or into a second switching position that is associated with the second switching state of the coupling.

8. The mechanical device of claim 7, wherein the switching element of the switching device is configured to be moved counter to the action of a restoring force from the first switching position into the second switching position or from the second switching position into the first switching position.

9. The mechanical device of claim 1, wherein:
the switchable coupling comprises a coupling element that, by means of the switching device, is configured to be moved into a supply position that is associated with the first switching state of the switchable coupling and into a change position that is associated with the second switching state of the switchable coupling,
the coupling element in the supply position produces a drive connection between the drive motor and the nozzle holder carrier and, in the change position, produces a drive connection between the drive motor and the nozzle holder,
the switching device of the switchable coupling comprises a switching element that is configured to be moved by means of a switching drive between a first switching position associated with the supply state of the coupling and a second switching position associated with the change state of the coupling,
the coupling element is configured to be moved into the supply position when the switching element of the switching device is moved into the first switching position, and
the coupling element is configured to be moved into the change position when the switching element of the switching device is moved into the second switching position.

10. The mechanical device of claim 1, further comprising a switchable arresting device that is configured to arrest the nozzle holder carrier of the nozzle magazine against a positioning movement when the nozzle holder is in the change position.

11. The mechanical device of claim 10, wherein the switchable arresting device for the nozzle holder carrier comprises an arresting element that is configured to be moved by an arresting drive into one or more of an arresting position and a release position, the arresting element in the arresting position arresting the nozzle holder carrier against a positioning movement being carried out and in the release position releasing the nozzle holder carrier to carry out a positioning movement.

12. The mechanical device of claim 11, wherein the arresting element of the arresting device is configured to be moved counter to the action of a restoring force between the arresting position and the release position.

13. The mechanical device of claim 12, wherein at least two of the coupling element, the switching element, and the arresting element are drivingly connected to each other.

14. A laser processing machine for processing workpieces, wherein the laser processing machine comprises:
a nozzle receiving member configured to receive a laser nozzle; and
a mechanical device that is configured to assemble a laser nozzle on the nozzle receiving member, to disassemble a laser nozzle from the nozzle receiving member, or to both assemble a laser nozzle on the nozzle receiving member and to disassemble a laser nozzle from the nozzle receiving member, the mechanical device comprising:
a nozzle magazine on a nozzle holder carrier, where the nozzle magazine includes at least one nozzle holder configured to receive a laser nozzle;
a positioning drive configured to jointly move the nozzle holder carrier and the nozzle holder with a positioning movement and to thereby move the nozzle holder into a change position;
a change drive configured to rotate the nozzle holder, which is in the change position, about a nozzle holder rotation axis;
a common drive motor for the positioning drive and the change drive; and
a switchable coupling between the common drive motor on the one hand and the nozzle holder carrier and the nozzle holder on the other hand, wherein the switchable coupling is configured to be switched by a switching device such that:
in a first switching state of the switchable coupling, a drive connection is produced between the drive motor and the nozzle holder carrier to enable the nozzle holder carrier and the nozzle holder to be jointly moved with a positioning movement and to thereby enable the nozzle holder to be moved into a change position; and
in a second switching state of the switchable coupling, a drive connection is produced between the drive motor and the nozzle holder, which is in the change position, to enable the nozzle holder to be rotated about the nozzle holder rotation axis with a change movement.

15. The laser processing machine of claim 14, wherein the nozzle holder carrier is a magazine turret that is configured to be rotated about a turret rotation axis with a positioning movement actuated by the common drive motor.

16. The laser processing machine of claim 14, wherein the switchable coupling comprises a coupling element that is configured to be moved upon movement of the switching device into a supply position associated with the first switching state of the switchable coupling and into an change position associated with the second switching state of the switchable coupling such that, in the supply position, the coupling element produces a drive connection between the drive motor and the nozzle holder carrier and, in the change position, the coupling element produces a drive connection between the drive motor and the nozzle holder.

17. The laser processing machine of claim 14, wherein the switching device of the switchable coupling comprises a switching element that is configured to be moved by actuation of a switching drive into a first switching position that is associated with the first switching state of the coupling or into a second switching position that is associated with the second switching state of the coupling.

18. The laser processing machine of claim 14, wherein:
the switchable coupling comprises a coupling element that, by means of the switching device, is configured to be moved into a supply position that is associated with the first switching state of the switchable coupling and into a change position that is associated with the second switching state of the switchable coupling,
the coupling element in the supply position produces a drive connection between the drive motor and the nozzle holder carrier and, in the change position, produces a drive connection between the drive motor and the nozzle holder,
the switching device of the switchable coupling comprises a switching element that is configured to be moved by means of a switching drive between a first switching position associated with the supply state of the coupling and a second switching position associated with the change state of the coupling,
the coupling element is configured to be moved into the supply position when the switching element of the switching device is moved into the first switching position, and
the coupling element is configured to be moved into the change position when the switching element of the switching device is moved into the second switching position.

19. The laser processing machine of claim 14, further comprising a switchable arresting device that is configured to arrest the nozzle holder carrier of the nozzle magazine against a positioning movement when the nozzle holder is in the change position.

20. The laser processing machine of claim 19, wherein the switchable arresting device for the nozzle holder carrier comprises an arresting element that is configured to be moved by an arresting drive into one or more of an arresting position and a release position, the arresting element in the arresting position arresting the nozzle holder carrier against a positioning movement being carried out and in the release position releasing the nozzle holder carrier to carry out a positioning movement.

\* \* \* \* \*